United States Patent
Huang

(10) Patent No.: US 9,307,807 B2
(45) Date of Patent: Apr. 12, 2016

(54) TIE LOCKING DEVICE

(71) Applicant: Wen-Sheng Huang, Miaoli County (TW)

(72) Inventor: Wen-Sheng Huang, Miaoli County (TW)

(*) Notice: Subject to any disclaimer, the term of this patent is extended or adjusted under 35 U.S.C. 154(b) by 9 days.

(21) Appl. No.: 14/308,885

(22) Filed: Jun. 19, 2014

(65) Prior Publication Data

US 2015/0366299 A1 Dec. 24, 2015

(51) Int. Cl.
*E05B 73/00* (2006.01)
*A44B 11/12* (2006.01)
*A44B 11/10* (2006.01)

(52) U.S. Cl.
CPC ............... *A44B 11/12* (2013.01); *A44B 11/10* (2013.01); *Y10T 24/40* (2015.01); *Y10T 24/4019* (2015.01); *Y10T 24/4079* (2015.01); *Y10T 70/5009* (2015.04)

(58) Field of Classification Search
CPC . Y10T 24/4019; Y10T 24/4079; Y10T 24/40; Y10T 70/5009; A44B 11/10; A44B 11/12
USPC ................. 70/14, 15, 18, 30, 49, 57, 58, 233; 24/167, 170, 171, 191, 194
See application file for complete search history.

(56) References Cited

U.S. PATENT DOCUMENTS

| | | | |
|---|---|---|---|
| 2,327,741 A * | 8/1943 | Tom Poole Asby | A43C 11/1413 24/170 |
| 3,592,028 A * | 7/1971 | La Monica | A44B 11/12 24/191 |
| 3,818,548 A * | 6/1974 | Meyerson | A44B 11/06 24/170 |
| 4,685,315 A * | 8/1987 | Comolli | A44B 11/005 190/120 |
| 5,692,403 A * | 12/1997 | Ling | E05B 37/02 70/312 |
| 6,199,412 B1 * | 3/2001 | Kennedy | A44B 11/14 224/568 |
| 6,212,919 B1 * | 4/2001 | Gerow | E05B 67/003 24/132 R |
| 6,598,433 B1 * | 7/2003 | Malvasio | E05B 73/00 70/18 |
| 6,883,354 B1 * | 4/2005 | Yu | E05B 37/02 70/18 |
| 7,293,438 B2 * | 11/2007 | Benda | F16G 11/04 24/132 WL |
| 7,424,813 B2 * | 9/2008 | Wu | E05B 37/0034 70/18 |
| 7,461,527 B2 * | 12/2008 | Yu | E05B 37/0034 70/18 |
| 7,870,767 B2 * | 1/2011 | Brojanac | E05B 67/383 137/385 |
| 8,234,757 B2 * | 8/2012 | Lesley | A44B 11/16 24/170 |
| 9,032,764 B2 * | 5/2015 | Yeh | E05B 65/00 70/14 |
| 2004/0154358 A1 * | 8/2004 | Yu | E05B 73/0005 70/30 |
| 2006/0283215 A1 * | 12/2006 | Manthe | E05B 67/383 70/14 |
| 2007/0251279 A1 * | 11/2007 | Hollier | E05B 73/007 70/15 |

* cited by examiner

*Primary Examiner* — Lloyd Gall
(74) *Attorney, Agent, or Firm* — Rosenberg, Klein & Lee

(57) ABSTRACT

A tie locking device includes a main body and a rotatable press cover. The main body includes a fixing section and at least one wall connected with the fixing section. The press cover has a pivoted end pivotally connected with a pivoted section of the main body. The pivoted end of the press cover and the pivoted section of the main body together define an inlet for a tie to enter the main body. A valve board is disposed on the main body and movable within the main body between a first position distal from the inlet and a second position proximal to the inlet. The valve board is formed with a toothed section. After the valve board is moved to the second position, the toothed section bites the tie and the press cover is pressed onto the main body to fix the valve board and the tie.

15 Claims, 4 Drawing Sheets

TIE LOCKING DEVICE

BACKGROUND OF THE INVENTION

1. Field of the Invention

The present invention relates generally to a tie locking device, and more particularly to a tie locking device in which the press cover can be easily pressed down onto the main body to fix the tie in a tightened state.

2. Description of the Related Art

A conventional tie, rope or the like is used to tie an article. A locking device can be used in cooperation with the tie to tighten and fix the article. The locking device includes a main body and a shift member equipped with a lock head. One end of the shift member is pivotally rotatably connected with the main body. After the rope is passed through the main body to tie the article, a worker pulls up the shift member, whereby one end of the shift member bites the rope. Then the worker can use a key to rotate the lock head to lock the shift member and keep the rope bitten by the shift member.

When the worker holds the main body and pulls up the shift member to bite the rope with both hands, it is very hard for the worker to further use the key to rotate the lock head. As well known by those who are skilled in this field, after the shift member is pulled up to bite the rope and then locked to keep the rope fixed, the locking device will protrude from the main body to enlarge the volume In this case, during transfer, the locking device is likely to collide with other objects. As a result, the lock device may be damaged to unlock the shift member. Under such circumstance, the rope will be released to untie the article. This is not what we expect.

The conventional tie locking device has some shortcomings in use and structural design that needs to be overcome. It is therefore tried by the applicant to provide a tie locking device to eliminate the shortcomings existing in the conventional tie locking device so as to widen the application range of the tie locking device. For example, in the conventional tie locking device, the shift member is pulled up to bite the rope (or the tie). In contrast, the tie locking device of the present invention employs a press cover, which is pressed down to bite the tie. Therefore, the lock head will not protrude from the main body so that the volume is minified without occupying much room. In this case, the locking device is prevented from colliding with other objects and protected from being damaged. Moreover, in operation of the locking device, a worker can press the press cover and the main body with one hand and use a key to rotate the lock head and lock the press cover with the other hand. Therefore, the operation of the tie locking device of the present invention is simple.

SUMMARY OF THE INVENTION

It is therefore a primary object of the present invention to provide a tie locking device, which can be easily operated.

To achieve the above and other objects, the tie locking device of the present invention includes a main body and a rotatable press cover. The main body includes a fixing section and at least one wall connected with the fixing section. The press cover has a pivoted end pivotally connected with a pivoted section of the main body. The pivoted end of the press cover and the pivoted section of the main body together define an inlet for a tie to enter the main body. A valve board is disposed on the main body and movable within the main body between a first position distal from the inlet and a second position proximal to the inlet. The valve board is formed with a toothed section. After the valve board is moved to the second position, the toothed section bites the tie and the press cover is pressed onto the main body to fix the valve board and the tie. The tie locking device of the present invention overcomes the shortcomings of the conventional tie locking device that the conventional tie locking device cannot be easily operated by one single worker and the volume of the conventional tie locking device is larger.

In the above tie locking device, the press cover has an arm. When the valve board is moved to the second position, the press cover is pressed down, whereby the arm hinders the valve board from moving to the first position and the free end of the arm bites the tie to help the toothed section of the valve board in fixing the tie.

The present invention can be best understood through the following description and accompanying drawings, wherein:

DETAILED DESCRIPTION OF THE PREFERRED EMBODIMENTS

Figure 1:
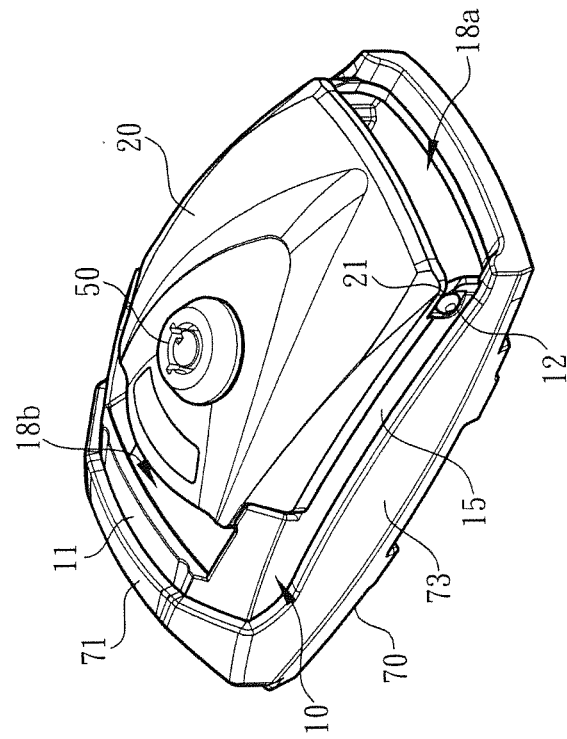
FIG. 1 is a perspective view of the present invention, showing that the press cover is positioned in a locking position and closed onto the main body.
Figure 2:
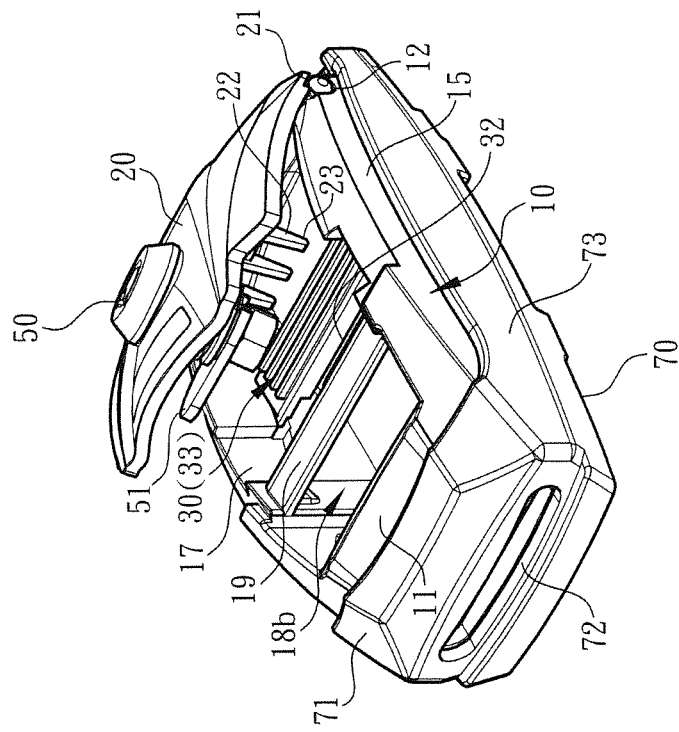
FIG. 2 is another perspective view of the present invention, showing that the press cover is positioned in an unlocking position and opened from the main body.
Figure 3:
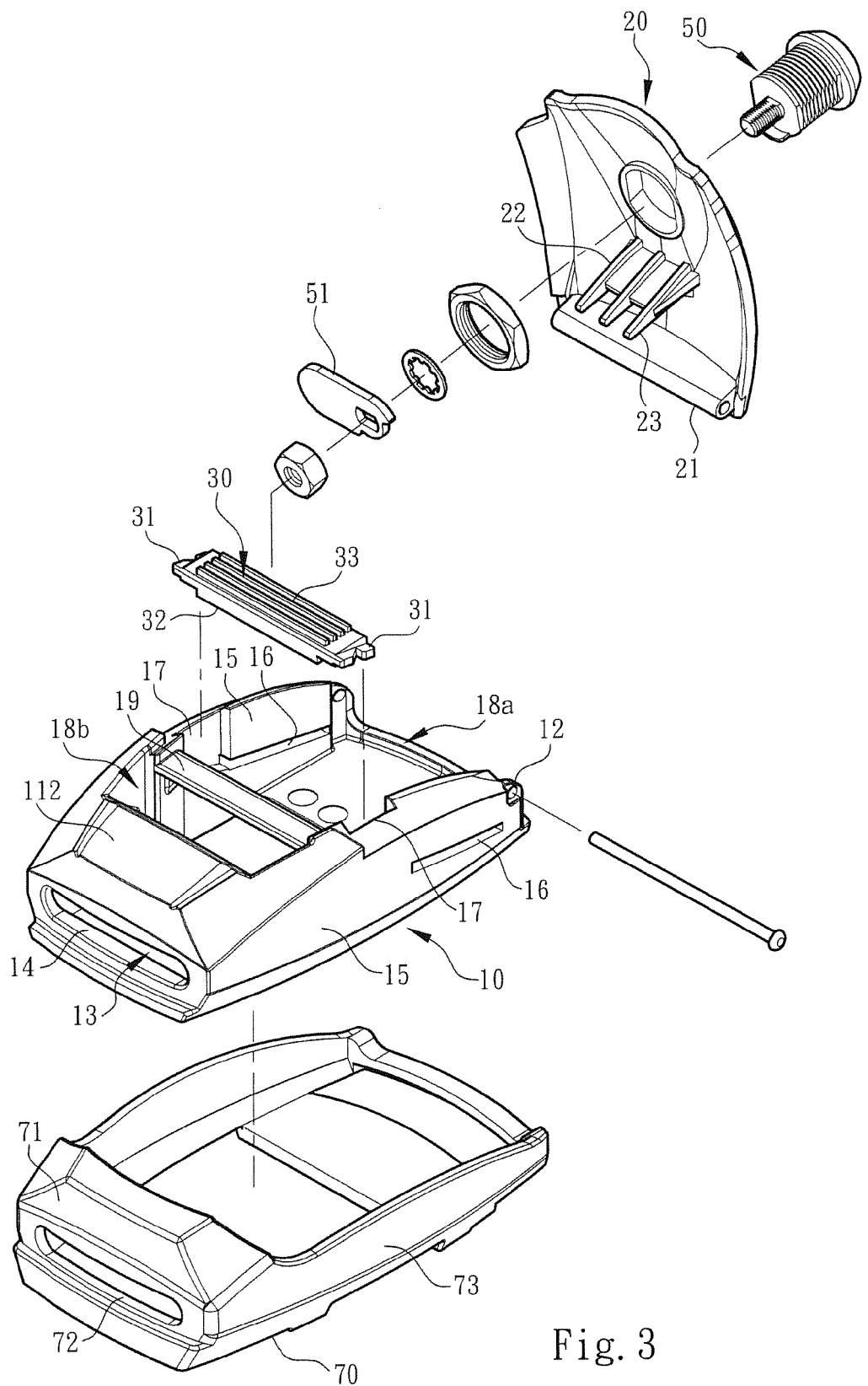
FIG. 3 is a perspective exploded view of the present invention, showing the structures of the main body, the press cover and the valve board.
Figure 4:
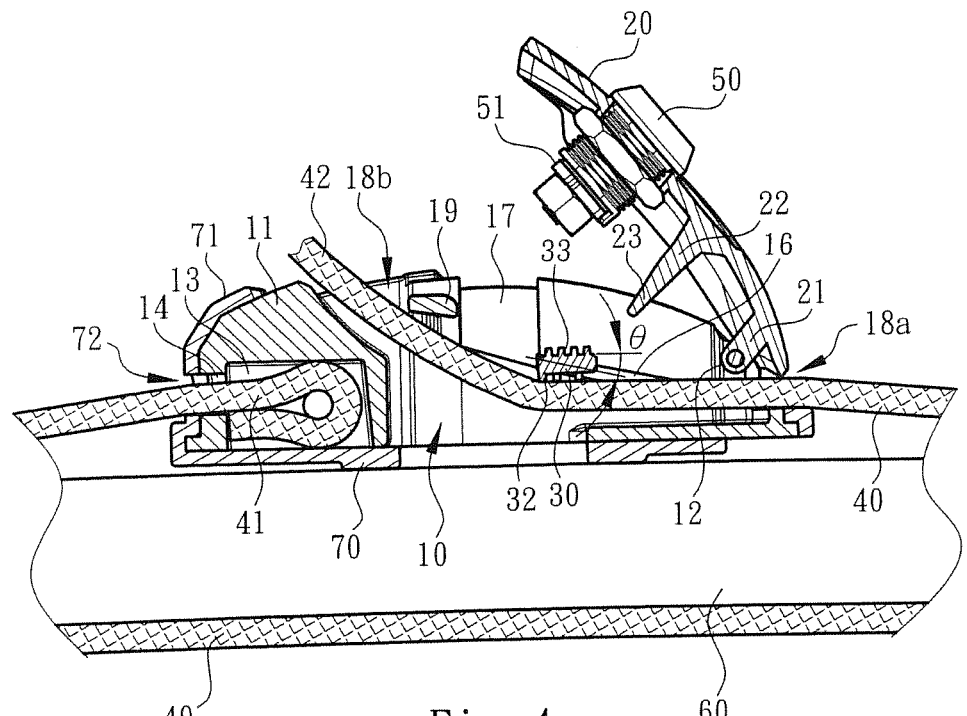
FIG. 4 is a sectional view of the present invention, showing the operation thereof, in which the valve board is positioned in the first position and the tie is passed through the main body and the press cover.

Please refer to FIGS. 1, 2 and 3. The tie locking device of the present invention includes a main body 10 and a rotatable press cover 20. The main body 10 includes a fixing section 11 and a pivoted section 12. The fixing section 11 is formed with a cavity 13 and an opening 14 in communication with the cavity 13. One end 41 of a tie 40 (as shown in FIG. 4) is fixed in the cavity 13. The tie 40 extends out from the opening 14. At least one side or two sides of the main body 10 are formed with walls 15 connected with the fixing section 11 and rails 16 disposed on the walls 15 for mounting a valve board 30.

The main body 10 is assembled on a seat 70. The seat 70 has a head section 71 corresponding to the main body 10 for at least partially enclosing the fixing section 11 of the main body. An opening 72 is formed on the head section 71 corresponding to the opening 14 of the main body. Two sides of the seat 70 are formed with sidewalls 73 for at least partially enclosing the walls 15 of the main body 10.

In a preferred embodiment, the wall 15 of the main body 10 is formed with a recess 17. The support sections 31 of two ends of the valve board 30 can be mounted into the rails 16 through the recesses 17. The valve board 30 is movable along the rails 16 between a first position and a second position. The valve board 30 is a board body, having a push face 33 and a toothed section 32 disposed under a bottom face of the valve board 30. When the valve board 30 is moved toward the second position, the toothed section 32 is used to bite the tie 40. (This will be further described hereinafter). The push face 33 is a roughened face for increasing the frictional force between a finger and the valve board 30.

Please refer to FIG. 4. It should be noted that a push angle θ is contained between the push face 33 and the rails 16 (or the moving path from the first position to the second position). The push angle θ is about 10°~45°.

Please refer to FIGS. 3 and 4. The press cover 20 has a pivoted end 21 pivotally connected with the pivoted section 12 of the main body 10, whereby the press cover 20 is freely rotatable. An inlet 18a is defined between the pivoted section 12 of the main body and the pivoted end 21 of the press cover. The other end 42 of the tie 40 can enter the main body 10 from the inlet 18a. A restriction section 19 is disposed on the main body 10 in the form of a plate. The restriction section 19 is connected with the walls 15. An outlet 18b is defined between the restriction section 19 and the fixing section 11. The other end 42 of the tie 40 can extend out of the main body 10 through the outlet 18b.

The press cover 20 is equipped with a lock head 50 and a lock plate 51 controlled by the lock head 50 to lock or unlock. In this embodiment, the press cover 20 has at least one arm 22 positioned between the lock head 50 and the pivoted end 21 for hindering the valve board 30 from moving. The arm 22 has the form of a finger and perpendicularly or nearly perpendicularly protrudes from the press cover 20. The arm 22 has a free end 23. After the press cover 20 is pressed down, the free end 23 will bite the tie 40 to help the toothed section 32 of the valve board in fixing the tie 40.

Figure 5:
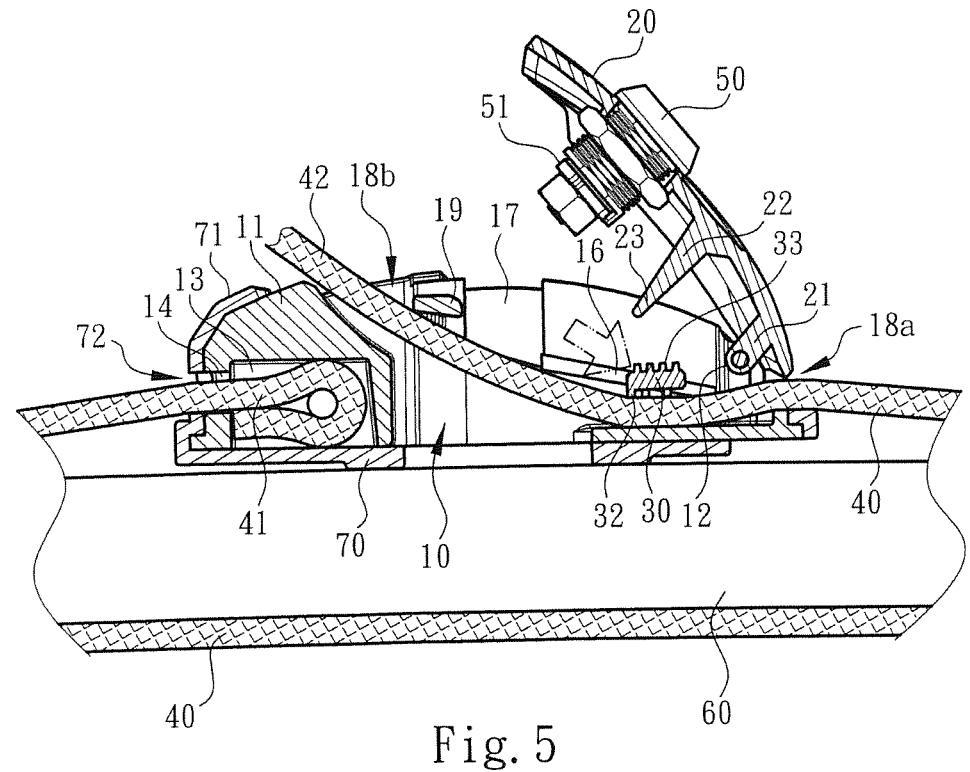
FIG. 5 is another sectional view of the present invention, showing the operation thereof, in which the valve board is moved to the second position to bite the tie.

Please refer to FIGS. 4 and 5. FIG. 4 shows that the valve board 30 is positioned in the first position of the main body 10 or the rails 16, where the valve board 30 permits the tie 40 to be pulled tight or released. FIG. 4 also shows that the other end 42 of the tie 40 enters the main body 10 from the inlet 18a to pass through the valve board 30 and extend out of the main body 10 through the outlet 18b. After the tie 40 is pulled tight to tie an article 60, a worker pushes the valve board 30 from the first position to the second position, whereby the toothed section 32 of the valve board 30 bites the tie 40.

Figure 6:
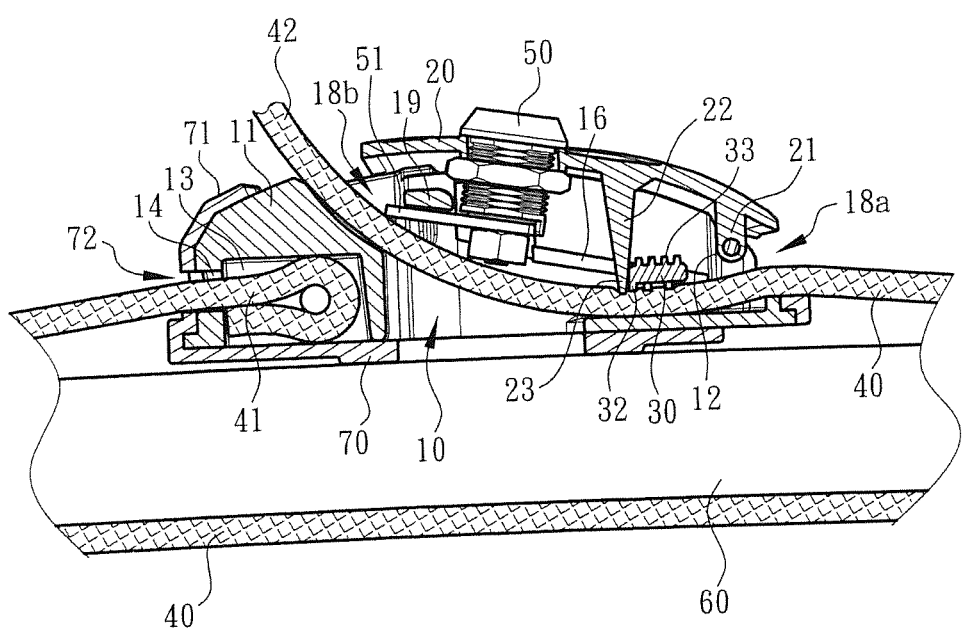
FIG. 6 is still another sectional view of the present invention, showing the operation thereof, in which the press cover is pressed down to a locking position to bite the tie and is locked with the main body by the lock head.

FIG. 6 shows that the press cover 20 is pressed down and the arm 22 hinders the valve board 30 from moving to the first position. Also, the free end 23 of the arm 22 bites the tie 40 to help the toothed section 32 of the valve board 30 in fixing the tie 40. In this operation mode, the worker can press the press cover 20 and the main body 10 with one hand and use a key to rotate the lock head 50 and the lock plate 51 with the other hand, whereby the lock plate 51 is moved into the restriction section 19 to lock the press cover 20. Under such circumstance, the valve board 30 and the tie 40 are fixed. The press cover 20 can be opened to release the tie 40 from the valve board 30 only when the worker uses the key to unlock the lock plate 51.

In comparison with the conventional device, the tie locking device of the present invention has the following advantages:
1. The locking device, the main body 10, the press cover 20 and the relevant components are redesigned and different from the conventional device in use and operation form. For example, the valve board 30 is formed with the toothed section 32 and is movable between the first and second positions of the main body 10 or the rails 16 to release or bite the tie 40. The press cover 20 has the arm 22 to hinder the valve board 30 from moving. The locking device of the present invention is free from the shift member of the conventional device, which is pulled up to bite the rope or the tie.
2. The main body 10 and the press cover 20 structurally cooperate with each other to facilitate the operation of the locking device. That is, a worker can easily use a key to rotate the lock head 50 and the lock plate 51 to lock the press cover 20 so as to fix the valve board 30 and the tie 40. Moreover, the locking device will not protrude from the main body so that the volume is minified without occupying much room. In this case, the locking device is prevented from colliding with other objects and protected from being damaged. Accordingly, the tie can keep in a tightened state.

The above embodiments are only used to illustrate the present invention, not intended to limit the scope thereof. Many modifications of the above embodiments can be made without departing from the spirit of the present invention.

What is claimed is:
1. A tie locking device comprising:
a main body; and
a rotatable press cover, the main body including a fixing section and at least one wall connected with the fixing section, the press cover having a pivoted end pivotally connected with a pivoted section of the main body, the pivoted end of the press cover and the pivoted section of the main body together defining an inlet, a valve board being disposed on the main body and movable within the main body between a first position and a second position, whereby after the valve board is moved to the second position, the press cover can be pressed onto the main body to fix the valve board;
wherein the fixing section of the main body is formed with a cavity and an opening in communication with the cavity, one end of a tie being fixed in the cavity, the tie extending out from the opening and going into the main body from the inlet, a rail being disposed on said at least one wall for mounting the valve board, the valve board being movable along the rail between the first position and the second position; and
wherein said at least one wall of the main body is formed with a recess, the valve board being a board body, having a roughened push face, a toothed section formed under a bottom face of the valve board and support sections formed at two ends of the valve board, one of the support sections being mounted into the rail through the recess, a push angle being contained between the push face and a moving path from the first position to the second position.

2. The tie locking device as claimed in claim 1, wherein the press cover is equipped with a lock head and a lock plate controlled by the lock head to lock or unlock, the press cover having at least one arm positioned between the lock head and the pivoted end, said at least one arm having the form of a finger and protruding from the press cover, said at least one arm having a free end.

3. The tie locking device as claimed in claim 1, wherein a restriction section is disposed on the main body in the form of a plate, the restriction section being connected with said at least one wall, an outlet being defined between the restriction section and the fixing section.

4. The tie locking device as claimed in claim 2, wherein a restriction section is disposed on the main body in the form of a plate, the restriction section being connected with said at least one wall, an outlet being defined between the restriction section and the fixing section.

5. The tie locking device as claimed in claim 1, wherein the main body is assembled on a seat, the seat having: a head section corresponding to the main body for at least partially enclosing the fixing section of the main body; an opening formed on the head section corresponding to the opening of the main body; and sidewalls formed on two sides of the seat for at least partially enclosing said at least one wall of the main body.

6. The tie locking device as claimed in claim 2, wherein the main body is assembled on a seat, the seat having: a head section corresponding to the main body for at least partially enclosing the fixing section of the main body; an opening formed on the head section corresponding to the opening of the main body; and sidewalls formed on two sides of the seat for at least partially enclosing said at least one wall of the main body.

7. The tie locking device as claimed in claim 4, wherein the main body is assembled on a seat, the seat having: a head section corresponding to the main body for at least partially enclosing the fixing section of the main body; an opening formed on the head section corresponding to the opening of the main body; and sidewalls formed on two sides of the seat for at least partially enclosing said at least one wall of the main body.

8. The tie locking device as claimed in claim 4, wherein when the valve board is positioned in the second position of the main body, the toothed section of the valve board bites the tie, the press cover being pressed down, whereby said at least one arm hinders the valve board from moving to the first position and the free end of said at least one arm also bites the tie and the lock plate is moved into the restriction section to lock the press cover.

9. The tie locking device as claimed in claim 7, wherein when the valve board is positioned in the second position of the main body, the toothed section of the valve board bites the tie, the press cover being pressed down, whereby said at least one arm hinders the valve board from moving to the first position and the free end of said at least one arm also bites the tie and the lock plate is moved into the restriction section to lock the press cover.

10. A tie locking device comprising:
a main body; and
a rotatable press cover, the main body including a fixing section and at least one wall connected with the fixing section, the press cover having a pivoted end pivotally connected with a pivoted section of the main body, the pivoted end of the press cover and the pivoted section of the main body together defining an inlet, a valve board being disposed on the main body and movable within the main body between a first position and a second position, whereby after the valve board is moved to the second position, the press cover can be pressed onto the main body to fix the valve board;
wherein the press cover is equipped with a lock head and a lock plate controlled by the lock head to lock or unlock, the press cover having at least one arm positioned between the lock head and the pivoted end, said at least one arm having the form of a finger and protruding from the press cover, said at least one arm having a free end.

11. The tie locking device as claimed in claim 10, wherein the fixing section of the main body is formed with a cavity and an opening in communication with the cavity, one end of a tie being fixed in the cavity, the tie extending out from the opening and going into the main body from the inlet, a rail being disposed on said at least one wall for mounting the valve board, the valve board being movable along the rail between the first position and the second position.

12. The tie locking device as claimed in claim 10, wherein a restriction section is disposed on the main body in the form of a plate, the restriction section being connected with said at least one wall, an outlet being defined between the restriction section and the fixing section.

13. The tie locking device as claimed in claim 11, wherein a restriction section is disposed on the main body in the form of a plate, the restriction section being connected with said at least one wall, an outlet being defined between the restriction section and the fixing section.

14. The tie locking device as claimed in claim 11, wherein the main body is assembled on a seat, the seat having: a head section corresponding to the main body for at least partially enclosing the fixing section of the main body; an opening formed on the head section corresponding to the opening of the main body; and sidewalls formed on two sides of the seat for at least partially enclosing said at least one wall of the main body.

15. The tie locking device as claimed in claim 13, wherein the main body is assembled on a seat, the seat having: a head section corresponding to the main body for at least partially enclosing the fixing section of the main body; an opening formed on the head section corresponding to the opening of the main body; and sidewalls formed on two sides of the seat for at least partially enclosing said at least one wall of the main body.

* * * * *